Oct. 4, 1949.　　　　L. A. DE ROSA　　　　2,483,403
PHASE SHIFTER
Filed April 24, 1943　　　　　　　　　　5 Sheets-Sheet 1
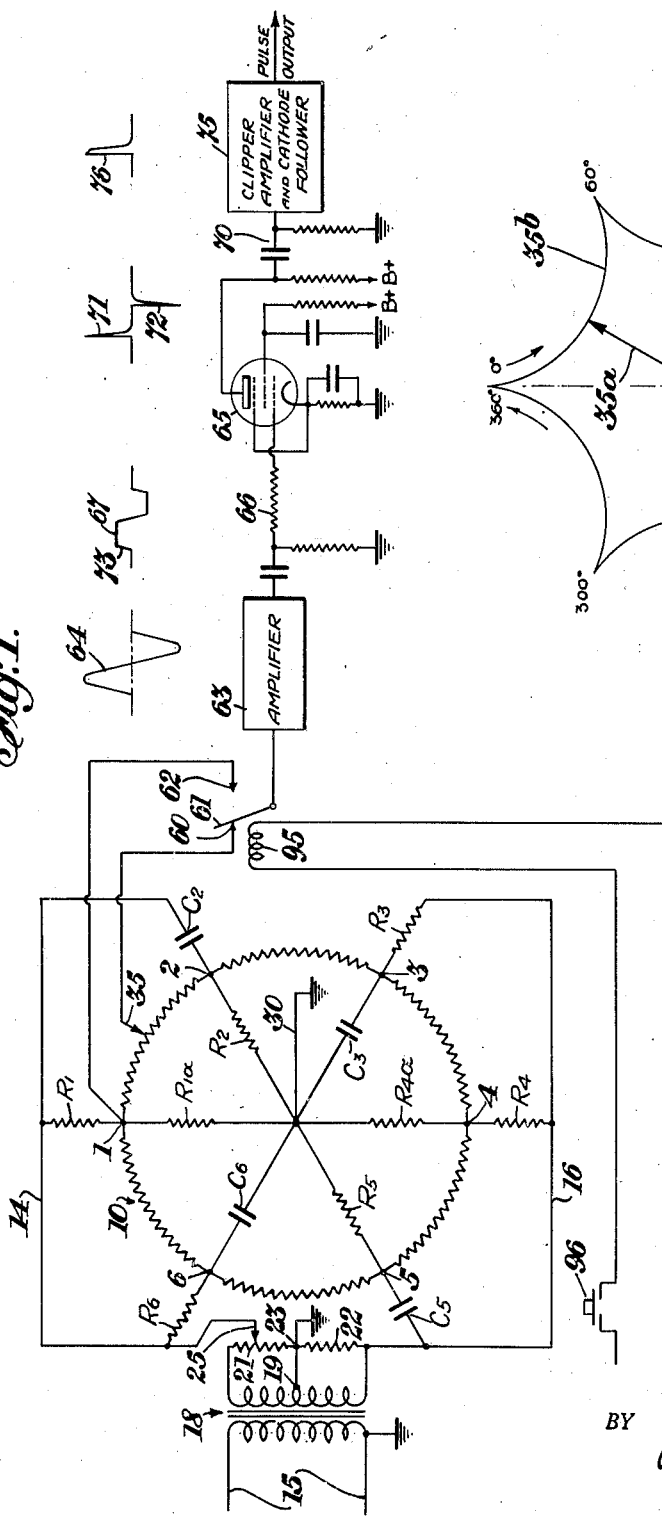
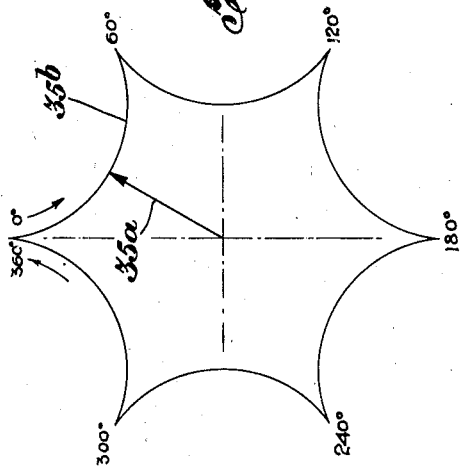
INVENTOR.
LOUIS A. DeROSA
BY
Percy P. Lantry
ATTORNEY

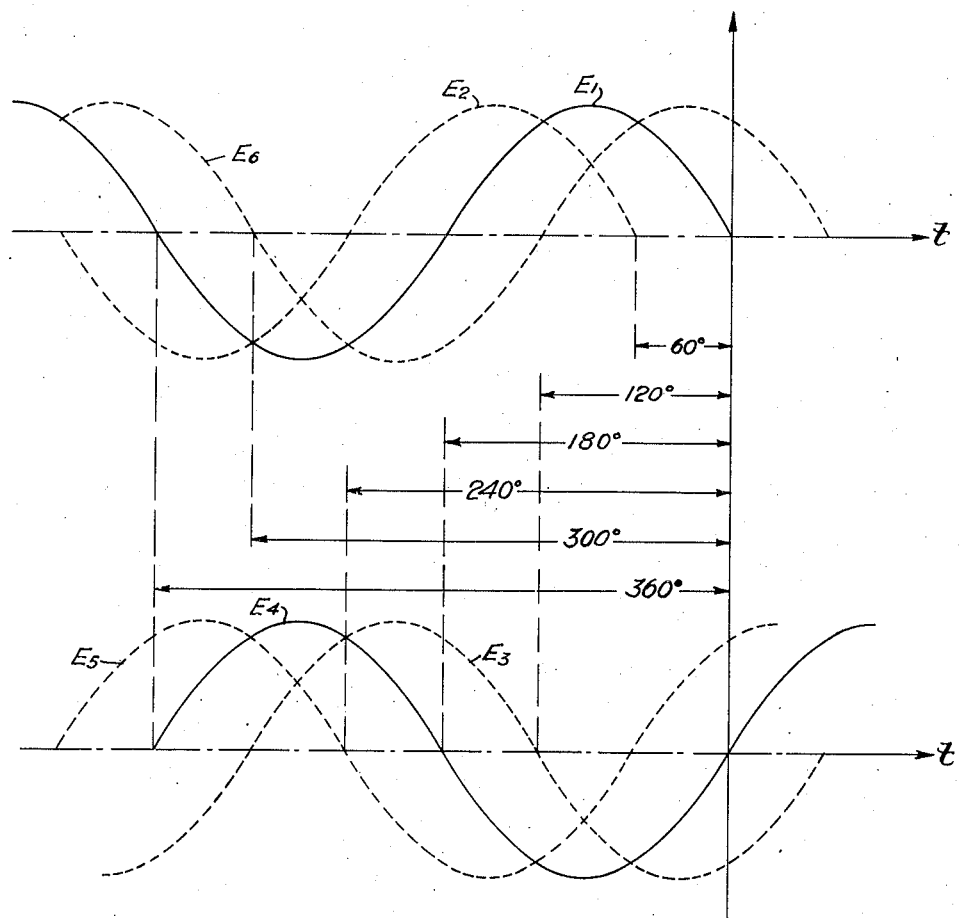

Oct. 4, 1949.　　　　L. A. DE ROSA　　　　2,483,403
PHASE SHIFTER

Filed April 24, 1943　　　　　　　　　　　　5 Sheets-Sheet 3

INVENTOR.
LOUIS A. DE ROSA
BY
ATTORNEY

Oct. 4, 1949.    L. A. DE ROSA    2,483,403
PHASE SHIFTER
Filed April 24, 1943    5 Sheets-Sheet 4

INVENTOR.
LOUIS A. DeROSA
BY
*Percy P. Lantzy*
ATTORNEY

Oct. 4, 1949.      L. A. DE ROSA      2,483,403
PHASE SHIFTER

Filed April 24, 1943                5 Sheets—Sheet 5

INVENTOR.
LOUIS A. DE ROSA
BY
*Percy P. Lantzy*
ATTORNEY

Patented Oct. 4, 1949

2,483,403

UNITED STATES PATENT OFFICE 2,483,403

PHASE SHIFTER

Louis A. de Rosa, Staten Island, N. Y., assignor to Federal Telephone and Radio Corporation, Newark, N. J., a corporation of Delaware Application April 24, 1943, Serial No. 484,795

11 Claims. (Cl. 178—44)

1

This invention relates to alternating current phase shifters.

One of the objects of my invention is to provide a compact, highly accurate phase shifter capable of fine adjustments for shifting phase through substantially 360°.

Another object of my invention is to provide a phase shifter to which alternating current is applied and an output pulse is produced defining a given point on the period of the alternating current which may be used as a reference pulse for use in radio detection systems and for other purposes.

A further object of the invention is to provide a phase shifter with means whereby the zero calibration thereof can be quickly checked without changing the phase adjustment thereof.

The above and other objects of the invention will become more apparent upon consideration of the following detailed description to be read in connection with the accompanying drawings, in which:

Fig. 1 is a schematic wiring and block diagram of one embodiment of the invention;

Fig. 2 is a graphical illustration of the phase shifting operation according to my invention;

Fig. 3 is a fragmentary plan view of the phase shifter showing certain construction features thereof;

Figure 5:
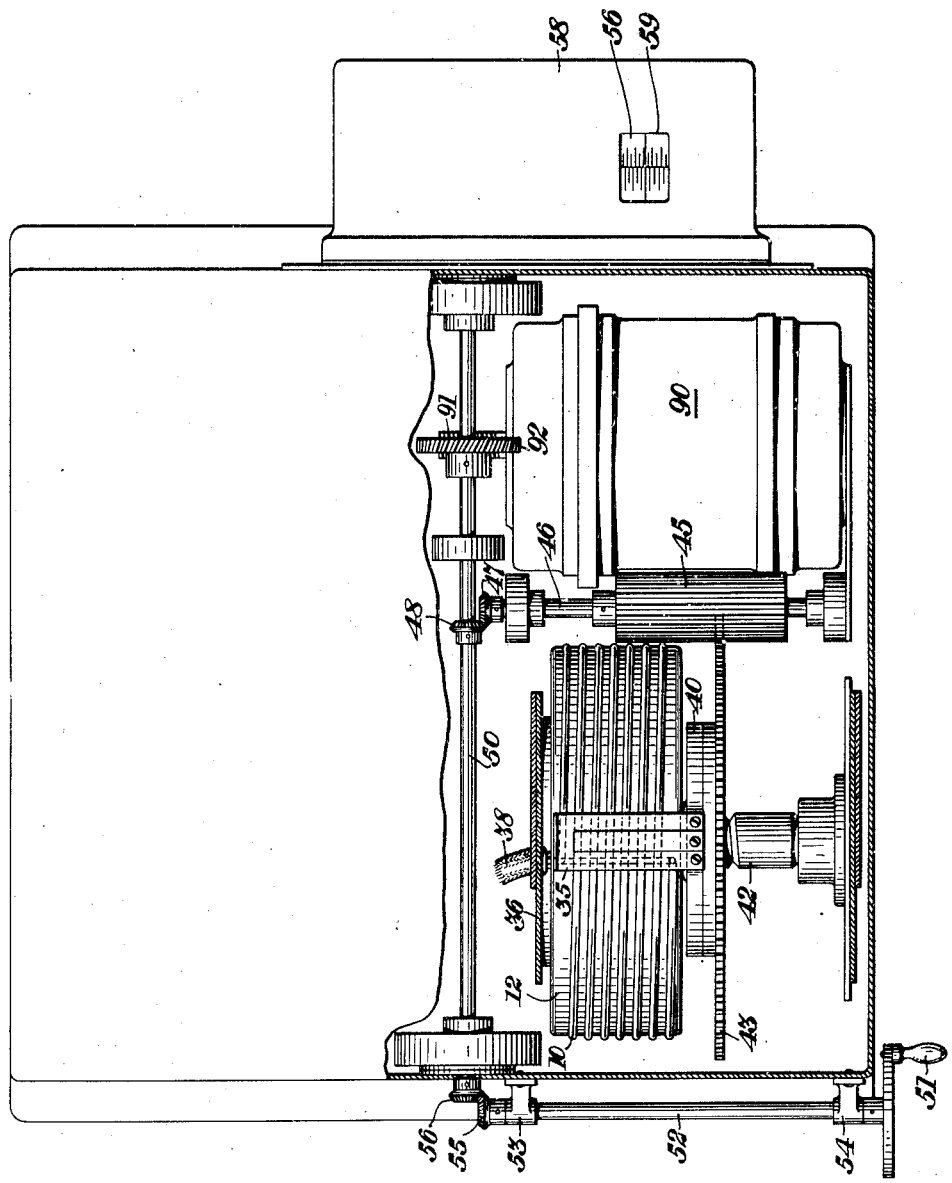
Fig. 5 is a graphical illustration of a vector diagram showing the variation in amplitude of the output voltage of the phase shifter for different degrees of phase shift.

Referring to Figs. 1 to 4 of the drawings, the embodiment of the invention therein illustrated includes a potentiometer resistor 10 which is made of resistor wire closely wound in a small diameter and arranged preferably in the form of a spiral about an insulator drum 12 with the two ends thereof connected together to form in effect a continuous resistor element such as illustrated in Fig. 1. The potentiometer resistor is divided into six sections as indicated by the points of network connections 1 to 6. The first, second and sixth points of connection have applied thereto, through parts of the network hereinafter described, one side 14 of an alternating current source 15. The points of connection 3, 4 and 5 are connected by network to the opposite side 16

2 of the same alternating current source. The source 15 includes a transformer 18 the secondary of which is connected across resistors 21 and 22 to the two sides 14 and 16. The center tap 19 of the secondary is connected to a center connection 23 between the resistors 21 and 22 and grounded. In order to insure an accurate division of the secondary with respect to ground, the side connection 14 is provided with a movable contact 25 so that by proper adjustment this balance can be obtained.

If desired, the load resistors 21 and 22 may be balanced by replacing the transformer 18 by two identical transformers, one placed across the resistor 21 and the other across the resistor 22.

The impedance network associated with the potentiometer coil 10 comprises in this embodiment a number of resistors and condensers. The connection points 1 and 4 are provided with two resistor elements $R_1$, $R_{1a}$ and $R_4$, $R_{4a}$ respectively. These resistors are selected equal. The resistors $R_1$ and $R_4$ are connected to the opposite side connections 14 and 16 respectively and the resistors $R_{1a}$ and $R_{4a}$ are connected to ground at a common ground connection 30. Since the IR drops across these resistors are in phase with the applied voltages between the two sides 14 and 16 on the one hand and ground 30 on the other hand, the phase at the points 1 and 4 will be exactly 180° difference in accordance with the phase difference between the opposite terminals of the secondary of the transformer 18. In Fig. 2, the applied voltage across the side connections 14 and 16 for an instantaneous value is represented by the curves $E_1$ and $E_4$. Since the IR drops to the points 1 and 4 are in phase with the voltages between the side connections 14 and ground, and 16 and ground, the curves $E_1$ and $E_4$ represent the instantaneous voltages at the points 1 and 4. Using point 1 as a reference point for the point 4 will then represent a phase difference therefrom of 180°.

To point 2 (Fig. 1) is connected a condenser $C_2$ and a resistor $R_2$. The condenser $C_2$ is connected to the side 14 thereby providing a phase advancement at point 2 with respect to the phase at point 1. The resistor $R_2$ is connected to ground 30 and the ratio of the IR drop of the resistor $R_2$ with respect to the reactance of condenser $C_2$ determines the shift in phase from point 1 to point 2. These values of $R_2$ and $C_2$ are so selected as to provide a ratio giving point 2 a phase advancement of 60 degrees with respect to point 1. This phase shift is indicated by the curve $E_2$ (Fig. 2).

Point 3 is likewise provided with a resistor $R_3$ and a condenser $C_3$. The connecting relation of these two elements with respect to the side 16 and ground 30 is the reverse of the connections $R_2$ and $C_2$. That is, the resistor $R_3$ is connected to the opposite side connection 16 and the condenser $C_3$ is connected to ground 30. In this reverse arrangement a condenser-resistor ratio provides a phase retardation with respect to the side 16 to ground. Thus, since point 4 is 180° different in phase from point 1, a phase retardation of 60 degrees will make point 3 120° out of phase with respect to point 1. This phase condition of point 3 is indicated by curve $E_3$ (Fig. 2).

Point 5 is provided with a resistor $R_5$ connected to ground 30 and a condenser $C_5$ connected to the side 16. This provides a phase advancement similar to the R—C ratio for point 2. This phase advancement is with respect to point 4 and gives point 5 in a clockwise direction in Fig. 1 a phase difference with respect to point 1 of 240° as indicated by curve $E_5$ (Fig. 2).

Point 6 is provided with a condenser $C_6$ connected to ground 30 and a resistor $R_6$ connected to the side 14. This provides a phase retardation of 60° with respect to the voltage applied to point 1 as indicated by curve $E_6$. The point 6 also has a corresponding phase advancement with respect to point 5 so that the phase difference in a clockwise direction with respect to point 1 is 300°.

It will be understood that $R_2$, $R_3$, $R_5$ and $R_6$ are of a given resistance and condensers $C_2$, $C_3$, $C_5$ and $C_6$ are of a given capacitance so that advancement or retardation in phase, as the case may be, between the successive points will be 60° for each section. It will also be understood that instead of measuring or calibrating the phase shifters in a clockwise direction, the calibration may be counterclockwise.

The output voltage from the phase shifter is taken off by a movable contact 35 which engages the potentiometer resistor 10 and is adapted to be moved therealong from point to point as desired. As the contact 35 is moved from point 1 toward point 2, the phase difference of the output voltage is an advancement with respect to the phase at point 1. This variation of the phase between points 1 and 2 is proportional to the position at which the contact 35 is located between these two points. Since the contact may be moved the full length of the potentiometer resistor, the output voltage may be given any desired phase shift up to 360° with respect to the phase of the applied voltage at point 1.

Figure 4:
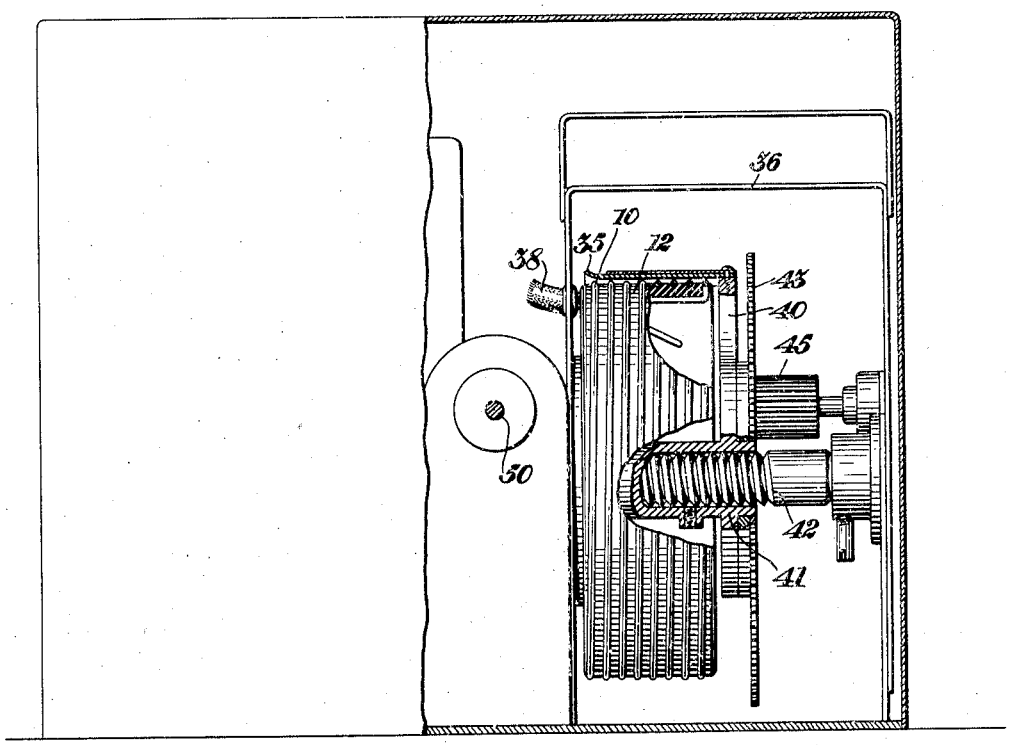
Fig. 4 is a vertical sectional view taken along line 4—4 of Fig. 3 with parts broken away to show diagrammatically the arrangement of the impedance network of the phase shifter.

Referring now to Figs. 3 and 4, the potentiometer-resistor 10 is provided with the connection points 1 to 6 through openings in the insulator drum 12 so that the connections to the resistors and condensers are passed inwardly of the drum. The resistors and condensers may be located in the drum or preferably on a support 36 where they are easily accessible for adjustment during testing of the assembly. The wires 37 connecting the resistors and condensers (not shown in Fig. 4) are lead through a cable 38. The connection arrangement makes for a compact phase shifter whereby the movable contact 35 is movable about the outside of the drum.

For adjustment of the contact 35, the contact is supported on an arm 40 carried by an internally threaded hub 41 supported on a threaded shaft 42. The hub 41 also carries a gear 43 which meshes with an elongated pinion 45. The pinion 45 is carried by a shaft 46 suitably supported in a parallel relation with respect to the shaft 42.

Connected to the shaft 46 is a bevel gear 47 meshed with a second bevel gear 48 carried by a shaft 50 disposed at right angles to the shaft 46. A hand crank 51 carried by a shaft 52 mounted on brackets 53, 54 is arranged to drive the shaft 50 through bevel gears 55 and 56. When the crank 51 is operated, rotation of the pinion 45 drives gear 43 thereby causing the hub 41 to rotate and at the same time traverse the shaft 42 in an axial direction. This causes the contact 35 to follow the spiral of the potentiometer-resistor 10.

For indication of the phase shift of the output voltage, I provide a rotatably mounted, calibrated drum 57 contained in a housing 58. The housing has a window 59 through which the calibrations on the drum are viewed. The drum 57 is driven by suitable reduction gearing (not shown) contained within the housing 58 and connected to the shaft 50. Preferably, the drum 57 is arranged to make one complete rotation for a complete movement from end to end along the length of the potentiometer element 10. The variation in amplitude of the output voltage, as indicated in Fig. 5, however, tends to vary the occurrence of the pulses 71 and 72 in accordance with change in steepness of the oscillations of wave 64. This variation, however, is greatly minimized according to my invention by selecting a high value for the resistance 66. The high resistance 66, in effect, provides a substantially linear relation between the grid bias and the grid input.

To check the zero phase calibration of the phase shifter without having to crank the contact 35 back to point 1, I provide a relay contact 62 connected to point 1. By controlling energization of relay coil 95 by switch 96, the movable contact 61 can be made to give alternately zero phase and the phase shift according to the location of the contact 35.

For remote indications of phase shift, the contact adjustment may be transmitted over a Selsyn motor circuit. For this purpose, I show a local Selsyn motor 90 driven off the shaft 50 by a worm 91 and worm gear 92.

Figure 6:
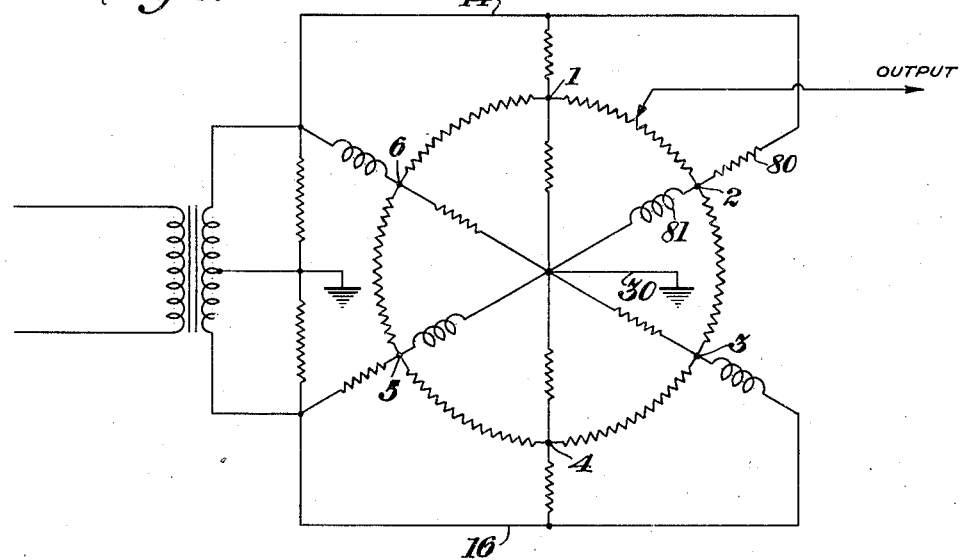
Figs. 6 and 7 are schematic illustrations of further embodiments of the invention.
Figure 7:
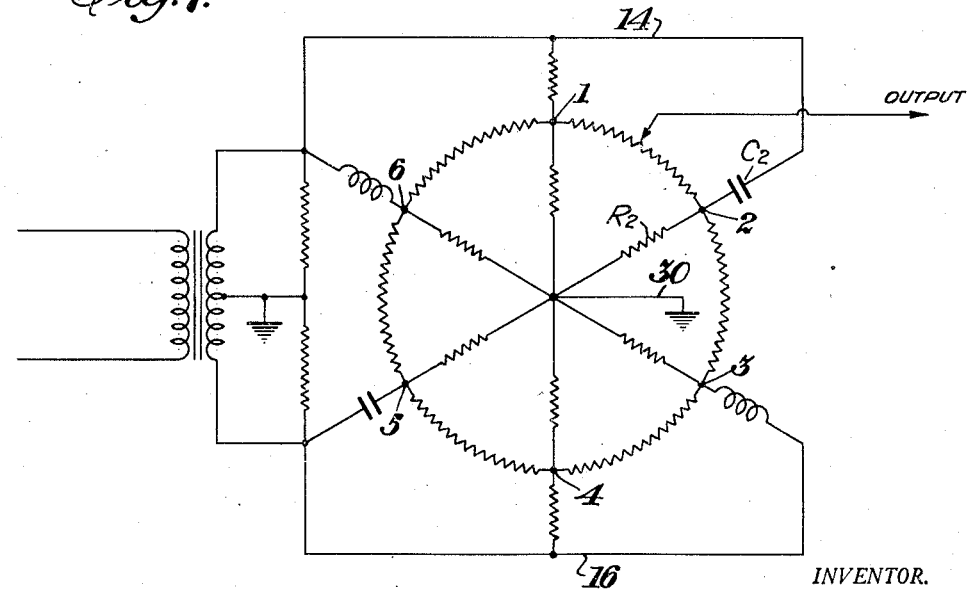

In Figs. 6 and 7, I have shown two additional embodiments of the invention. In Fig. 6 the impedance network comprises resistors and inductance elements while in Fig. 7 the network comprises combinations of resistors, capacitance and inductance elements. The resistor-condenser arrangement of Fig. 1, however, is preferable because the effect of changes in temperature are more easily minimized than where inductances are used. The embodiments in Figs. 6 and 7, however, carry out the principles of my invention similarly as in the case of the resistor-condenser arrangement of Fig. 1.

The amplitude of the output voltage is indicated by a vector $35a$ in Fig. 5. As the contact 35 is moved along the potentiometer resistor 10, the vector $35a$ will be moved proportionally in angular displacement and will trace an amplitude output curve $35b$. This output voltage varies in amplitude from point to point because of the resistance of the potentiometer element 10. As the contact approaches each point, the voltage will increase to a maximum and when the contact approaches the center portion of a section of the potentiometer element the amplitude will approach a minimum.

As shown in Fig. 1, the output voltage from the contact is conducted through relay contacts 60, 61 to an amplifier 63 of one or more stages whereby the voltage is amplified preparatory to a clipping and differentiating operation. A vacuum tube 65 is connected to the output of the amplifier through a resistor 66. The vacuum tube circuit is arranged to limit the oscillations of the wave 64 to provide a wave 67 of substantially rectangular shape. The rectangular wave 67 when applied to a differentiator circuit 70 provides positive and negative pulses 71 and 72, the positive pulse 71 representing the leading edge 73 of each period of the wave 67. By applying the pulses 71 and 72 to a circuit 75 comprising clipper, amplifier and cathode follower stages, a resulting pulse 76 is produced in response to each of the positive pulses 71.

The pulses 76 may be used directly as pulse energy to provide a reference indicator on the oscillograph of a radio detection system such as disclosed in my copending application Serial No. 464,008, filed October 31, 1942.

The resistor 80 and the inductance coil 81 at point 2 in Fig. 6 are reversed with respect to the resistor-condenser arrangement at point 2 in Fig. 1. That is, the resistor 80 is connected to the side connection 14 while the inductance 81 is connected to ground 30. This provides a phase advancement for point 2 with respect to point 1. This is because the inductance 81 is provided between the point 2 and ground rather than between point 2 and the side connection 14. The reactance across the inductance 81 produces a phase retardation with respect to ground 30 but in the inductance-resistor ratio produces in effect a phase advancement with respect to the applied voltage on the side connection 14. Thus, by substituting inductances for the condensers of Fig. 1 and reversing the resistors and inductance connections a similar phase shifting relation is produced.

In Fig. 7, I have shown the same condenser-resistor arrangement for point 2 as in Fig. 1. For point 3, I show an inductance-resistor arrangement the same as shown in point 3 in Fig. 6. These connecting networks are repeated for connections 5 and 6 respectively. It will be clear that the same phase shift is realized between the six connection points of Fig. 7 as between the corresponding points of Figs. 1 and 6.

While I have shown in Fig. 7 the resistors for the points 2, 3, 5 and 6 as connected to the ground 30, and the condensers and inductances connected to the two sides 14 and 16, it will be understood that the reverse arrangement may be made by using the connections shown at points 2 and 5 of Fig. 6 and the points 3 and 6 of Fig. 1. With this arrangement the condensers and inductance elements are all located between the connection points and ground 30.

While I have disclosed the principles of my invention in connection with several different embodiments, it will be understood that these embodiments are given by way of example only and not as limiting the scope of the invention as set forth in the objects and the appended claims.

I claim:

1. A phase shifter, comprising an impedance network including a potentiometer-resistor having parts of the network connected thereto at points spaced therealong to produce a given shift in phase between such points, the network being arranged to produce a phase shift which is accumulative from point to point, means to apply alternating current to said network, and a contact movable along said resistor to pick off energy shifted in phase with respect to said alternating current source according to the position of said contact with respect to said points, a relay having a relay contact connected to the first connection point of the phase shifter, a second relay contact connected to the movable contact of said phase shifter and a third contact controlled by the relay for selected engagement with said first and second contacts whereby the output of said third contact can be made to give alternately the zero phase and the phase shift according to the location of said movable contact.

2. A 360° phase shifter comprising an impedance network including a potentiometer resistor having parts of the network connected thereto at six points spaced therealong, means to apply one side of an alternating current source to the parts connected to the first, second and sixth connecting points and the other side of the alternating current source to the third, fourth and fifth points, the parts of the network associated with the first and fourth points comprise resistors whereby the first and fourth points are 180° difference in phase, the parts associated with the second and fifth points being arranged to provide a phase advancement of 60° with respect to first and fourth points respectively, and the parts associated with the third and sixth points being arranged to provide a retardation of 60° in phase with respect to the fourth and first points respectively.

3. The phase shifter defined in claim 2 wherein the parts of the network connected to said points comprise resistors and capacitance reactances.

4. The phase shifter defined in claim 2, wherein the parts of the network connected to said resistor at said points comprise resistors and inductance reactances.

5. The phase shifter defined in claim 2, wherein the potentiometer-resistor is arranged in the form of a continuous circuit and the contact is movable in a circular manner in engagement with said resistor.

6. The phase shifter defined in claim 2 wherein the parts associated with the second, third, fifth and sixth points comprise a resistor element and a reactance element for each point, one of said elements for each of said points being connected to ground and the other of said elements for each of said points being connected to one side of said source of alternating current.

7. The phase shifter defined in claim 2 wherein the parts associated with the second, third, fifth and sixth points comprise a resistor and a condenser for each such points, the resistors of the second and fifth points being connected to ground, the condensers of the second and fifth points being connected to opposite sides of the alternating current source, the condensers of the third and sixth points being connected to ground, and the resistors of the third and sixth points being connected to opposite sides of said alternating current source.

8. The phase shifter defined in claim 2 wherein the parts associated with the second, third, fifth and sixth points comprise a resistor and an inductance associated with each such points, the inductance of the second and fifth points being connected to ground, the resistors of the second and fifth points being connected to opposite sides of the alternating current source, resistors of the third and sixth points being connected to ground, and the inductances of the third and sixth points being connected to opposite sides of the alternating current source.

9. The phase shifter defined in claim 2 wherein the parts associated with the second, third, fifth and sixth points comprise a resistance element and a reactance element connected to each of such points, one element of each of said points being connected to ground, the other elements of the second and sixth points being connected to one side of the alternating current source and the elements of the third and fifth points being connected to the other side of the alternating current source.

10. The phase shifter defined in claim 2 wherein the parts associated with the second, third, fifth and sixth points comprise a resistor and a condenser connected to each of the second and fifth points and a resistor and an inductance connected to each of the third and sixth points, the resistors of said points being connected to ground and the condenser of point two and the inductance of point six being connected to one side of the alternating current source of the inductance of point three and the condenser of point five being connected to the other side of the alternating current source.

11. A phase shifter comprising an impedance network including a potentiometer-resistor having parts of the network connected thereto at points spaced therealong to provide a given phase shift between such points, means to apply an alternating current to said network, a contact movable along said resistor to pick off energy shifted in phase with respect to said alternating current according to the position of said contact, the energy picked off varying in amplitude in accordance with the position of said contact with respect to said points, means to limit the alternating current tapped off by said contact to produce a substantially rectangular wave-shape, said limit means including a vacuum tube having a control grid and a high resistor in series with the grid to minimize the effects of amplitude variation of energy applied thereto to render substantially constant the occurrence of the leading edges of the rectangular portions of said rectangular wave, means to differentiate said rectangular wave to produce alternate positive and negative pulses, and means to clip said pulses to produce unidirectional pulses defining a given point on the cycles of the alternating current wave according to the shift in phase determined by the position of the contact.

LOUIS A. DE ROSA.

REFERENCES CITED

The following references are of record in the file of this patent:

UNITED STATES PATENTS

| Number | Name | Date |
| --- | --- | --- |
| 1,717,400 | Nyquist | June 18, 1929 |
| 1,744,592 | Terpening | Jan. 21, 1930 |
| 1,964,522 | Lewis | June 26, 1934 |
| 2,085,940 | Armstrong | July 6, 1937 |
| 2,113,214 | Luck | Apr. 5, 1938 |
| 2,188,611 | Norton | Jan. 30, 1940 |
| 2,229,450 | Garman | Jan. 21, 1941 |